United States Patent
Shahriari et al.

(10) Patent No.: US 12,275,436 B2
(45) Date of Patent: Apr. 15, 2025

(54) TOW-VEHICLE DRIVING METHODS AND SYSTEMS FOR AUTOMATED DRIVING

(71) Applicant: GM GLOBAL TECHNOLOGY OPERATIONS LLC, Detroit, MI (US)

(72) Inventors: Mohammadali Shahriari, Markham (CA); Ashraf Abualfellat, Grand Blanc, MI (US); Reza Zarringhalam, Whitby (CA); Mehdi Abroshan, Waterloo (CA); Michael B. Peppard, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 352 days.

(21) Appl. No.: 17/821,829

(22) Filed: Aug. 24, 2022

(65) Prior Publication Data

US 2024/0067220 A1 Feb. 29, 2024

(51) Int. Cl.
 *B60W 60/00* (2020.01)
 *B60W 40/06* (2012.01)
(52) U.S. Cl.
 CPC ........ *B60W 60/0025* (2020.02); *B60W 40/06* (2013.01); *B60W 2520/125* (2013.01); *B60W 2530/203* (2020.02); *B60W 2552/20* (2020.02)
(58) Field of Classification Search
 CPC ............. B60W 60/0025; B60W 40/06; B60W 2552/20; B60W 2530/203; B60W 2520/125
 See application file for complete search history.

(56) References Cited

U.S. PATENT DOCUMENTS

| | | | |
|---|---|---|---|
| 9,120,359 B2 | 9/2015 | Chiu et al. | |
| 9,902,425 B2 | 2/2018 | Singh et al. | |
| 9,964,949 B2 | 5/2018 | Hay et al. | |
| 10,173,722 B2 | 1/2019 | Pourrezaei Khaligh et al. | |
| 10,347,125 B2 | 7/2019 | Camacho et al. | |
| 11,131,355 B2 | 9/2021 | White et al. | |
| 2009/0037062 A1* | 2/2009 | Lee ..................... | B60W 30/143 701/70 |

(Continued)

FOREIGN PATENT DOCUMENTS

WO WO-2024012706 A1 * 1/2024 ............ B60T 8/1708

*Primary Examiner* — Rami Khatib
*Assistant Examiner* — Eisen Yim
(74) *Attorney, Agent, or Firm* — Lorenz & Kopf LLP

(57) ABSTRACT

Automated driver assistance systems and methods for towing predict vehicle/trailer instabilities and adapt automated driving control to avoid them. A tow-vehicle includes a controller that, through an actuator system, controls speed and/or steering. A map system and/or a sensor system monitor a roadway on which the vehicle is travelling to identify a road profile located ahead of the vehicle over a prediction horizon. A projected trajectory for navigating the vehicle through the road profile over the prediction horizon and considering environmental conditions is determined. Before travel over the road profile, whether the projected trajectory through the road profile will result in exceeding a vehicle dynamic threshold is determined. When the projected trajectory will result in exceeding the vehicle dynamic threshold through the road profile, a control action is determined to prevent instability and optimize driver experience. The vehicle is operated through the road profile using the control action.

20 Claims, 9 Drawing Sheets

(56) References Cited

U.S. PATENT DOCUMENTS

| | | |
|---|---|---|
| 2015/0165850 A1* | 6/2015 | Chiu ........................ B60D 1/30 |
| | | 701/1 |
| 2017/0247032 A1 | 8/2017 | Lee et al. |
| 2017/0349213 A1 | 12/2017 | Abdel-Rahman et al. |
| 2019/0322317 A1 | 10/2019 | Pourrezaei Khaligh et al. |
| 2019/0361454 A1 | 11/2019 | Zeng et al. |
| 2020/0307551 A1* | 10/2020 | Horiguchi ............. B60W 30/02 |
| 2020/0324766 A1* | 10/2020 | Zhao ..................... B60W 30/16 |
| 2021/0370922 A1* | 12/2021 | Smith ................... B60W 40/10 |
| 2022/0155130 A1* | 5/2022 | Laine ................... G01G 19/021 |
| 2023/0286492 A1* | 9/2023 | Frankovics ........... B60W 10/20 |

* cited by examiner

TOW-VEHICLE DRIVING METHODS AND SYSTEMS FOR AUTOMATED DRIVING

INTRODUCTION

The present disclosure relates to automated vehicle driving while towing a trailer. More particularly, the disclosure relates to automated vehicle driver assistance systems and methods for towing that predict trailer instabilities and adapt automated driving control of the vehicle to maintain trailer stability.

Autonomous, semi-autonomous, and other types of automated vehicles may assist a driver in performing vehicle operation tasks, or may replace a driver in operating the vehicle. Such automated vehicles generally have one or more systems (e.g. a steering system, a braking system, and/or one or more other vehicle systems) that may be automatically operated by the vehicle. In addition, such automated vehicles are generally configured to operate in two modes: a "manual" mode in which the driver is able to manually operate the vehicle in the traditional manner, and an "automated" mode in which one or more of the systems of the vehicle are operated (wholly or in part) via a control system of the vehicle, independently of the driver.

Automated vehicles that maintain a desired speed of a vehicle, such as via a cruise control setting, obviate the need for the driver to operate the accelerator pedal for a range of driving road profiles. Automated vehicles that steer the vehicle to an intended destination may use high definition maps to provide lane-level topology, geometry, and additional details such as speed limit, traffic conditions, road sign information, etc. High-precision GPS equipment may be used to accurately locate the vehicle in the high-definition map. The ability to drive a vehicle using automation is proven, where the automated system operates the vehicle's steering to navigate the roadway, and operates the vehicle's brakes and accelerator to control vehicle speed.

When a vehicle tows a trailer an added level of complexity is added to driving. For example, a human driver may adapt their vehicle driving approach to accommodate the trailer being towed based on experience. With a cruise control system, a driver generally selects a speed for the vehicle to maintain and the selected speed will be maintained by the cruise control system. Some systems may adjust the vehicle speed to accommodate slower moving vehicles ahead in the lane, but operate independently of whether the vehicle is towing a trailer.

Accordingly, it is desirable to provide effective systems and methods for operating a vehicle in automated modes that consider the presence of a trailer. In addition, the systems and methods preferably consider the driving scenarios over which the vehicle is operated in making control determinations. Furthermore, other desirable features and characteristics of the present disclosure will become apparent from the subsequent detailed description and the appended claims, taken in conjunction with the accompanying drawings and the foregoing technical field and background.

SUMMARY

Automated driver assistance systems and methods for towing predict trailer instabilities and adapt automated driving control to maintain trailer stability. A tow-vehicle includes a controller that, through an actuator system, controls speed and/or steering. A map system and/or a sensor system are used to monitor a roadway on which the vehicle is travelling to identify a road profile located ahead of the vehicle over a prediction horizon and considering environmental conditions. A projected trajectory for navigating the vehicle through the road profile over the prediction horizon and considering environmental conditions is determined. Before travel over the road profile, whether the projected trajectory through the road profile will result in exceeding a vehicle dynamic threshold is determined. When the projected trajectory will result in exceeding the vehicle dynamic threshold through the road profile, a control action is determined to prevent instability and optimize driver experience. The vehicle is operated through the road profile using the control action.

In additional embodiments, on a non-transitory computer readable medium onboard the vehicle, vehicle data and trailer data is stored including parameters associated with a vehicle and parameters associated with the trailer. The computing includes determining, using the vehicle parameter data and the trailer parameter data, whether a sway speed limit of the vehicle through the road profile will be exceeded.

In additional embodiments, the computing includes determining whether a jackknifing speed limit of the vehicle through the road profile will be exceeded.

In additional embodiments, the computing includes determining whether a lateral acceleration of the vehicle through the road profile will be exceeded.

In additional embodiments, the monitoring includes identifying a downhill slope in the road profile. The control action includes slowing, by the controller via the actuator system, the vehicle prior to entering the downhill slope; and accelerating, by the controller via the actuator system, the vehicle while traversing the downhill slope.

In additional embodiments, a coefficient of the vehicle is estimated to predict lateral dynamics behavior of the vehicle with the trailer through the road profile.

In additional embodiments, the coefficient is a coefficient of understeer, and a determination is made of whether the estimated coefficient of understeer is greater than a design threshold.

In additional embodiments, when the coefficient of understeer is within a margin of the design threshold, a sway speed limit of the vehicle is computed.

In additional embodiments, when the coefficient of understeer is outside the margin, a jackknifing speed limit of the vehicle is computed.

In additional embodiments, the monitoring includes identifying a curve in the road profile. The control action includes slowing, by the controller via the actuator system, a rate at which the vehicle converges with the projected trajectory in the curve to avoid instability.

In a number of other embodiments, a driving control system for a vehicle towing a trailer, includes a controller that operates, via an actuator system, the vehicle by controlling at least one of speed and steering angle of the vehicle. Using at least one of a map system and a sensor system, a roadway on which the vehicle is travelling is monitored for a road profile of the roadway located ahead of the vehicle over a prediction horizon and considering environmental conditions. A projected trajectory is determined for navigating the vehicle through the road profile over the prediction horizon. A processor of the controller computes, before travel over the road profile, whether the projected trajectory through the road profile will result in exceeding a vehicle dynamic threshold. When the projected trajectory will result in exceeding the vehicle dynamic threshold through the road profile, a control action is determined to prevent instability and optimize driver experience. The actuator system is operated to guide the vehicle through the road profile using the control action.

In additional embodiments, a non-transitory computer readable medium onboard the vehicle stores vehicle data and trailer data including parameters associated with a vehicle and parameters associated with the trailer. The controller is configured to determine, using the vehicle data and the trailer data, whether a sway speed limit of the vehicle through the road profile will be exceeded.

In additional embodiments, the controller is configured to determine whether a jackknifing speed limit of the vehicle through the road profile will be exceeded.

In additional embodiments, the controller is configured to determine whether a lateral acceleration of the vehicle through the road profile will be exceeded.

In additional embodiments, the controller is configured to: identify a downhill slope in the road profile; slow, via the actuator system, the vehicle prior to entering the downhill slope; and accelerate, via the actuator system, the vehicle while traversing the downhill slope.

In additional embodiments, the controller is configured to estimate a coefficient of the vehicle, to predict lateral dynamics behavior of the vehicle with the trailer through the road profile.

In additional embodiments, the coefficient comprises a coefficient of understeer, and the controller is configured to determine whether the estimated coefficient of understeer is greater than a design threshold.

In additional embodiments, the controller is configured to: compute, only when the coefficient of understeer is within a margin of the design threshold, a sway speed limit of the vehicle; and compute, only when the coefficient of understeer is outside the margin, a jackknifing speed limit of the vehicle.

In additional embodiments, the controller is configured to: identify, via the monitoring, a curve in the road profile; and slow, by the controller via the actuator system, a rate at which the vehicle converges with the projected trajectory in the curve to avoid instability.

In a number of additional embodiments, a vehicle is configured to tow a trailer. The vehicle includes a non-transitory computer readable medium onboard the vehicle configured to store vehicle data and trailer data including parameters associated with a vehicle and parameters associated with the trailer. A controller operates the vehicle via an actuator system, by controlling at least one of speed and steering angle of the vehicle. Using at least one of a map system and a sensor system, a roadway on which the vehicle is travelling is monitored for a road profile of the roadway located ahead of the vehicle over a prediction horizon. A projected trajectory is determined for navigating the vehicle through the road profile over the prediction horizon and considering environmental conditions. A processor of the controller computes, before travel over the road profile and using the vehicle data and the trailer data, whether a vehicle dynamic threshold will be exceeded. The vehicle dynamic threshold comprises at least one of a sway speed limit of the vehicle through the road profile and a jackknifing speed limit of the vehicle through the road profile. When the projected trajectory will result in exceeding the vehicle dynamic threshold through the road profile, a control action is determined to prevent instability and optimize driver experience. Through control of the actuator system, the vehicle is operated through the road profile using the control action. The control action is selected from speed control, trajectory control and force control.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term engine refers to an internal combustion engine and the term motor refers to an electrical machine that may operate as a motor and/or a generator. The term hybrid powertrain refers to a vehicle propulsion system that employs both an engine and a motor. Also as used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
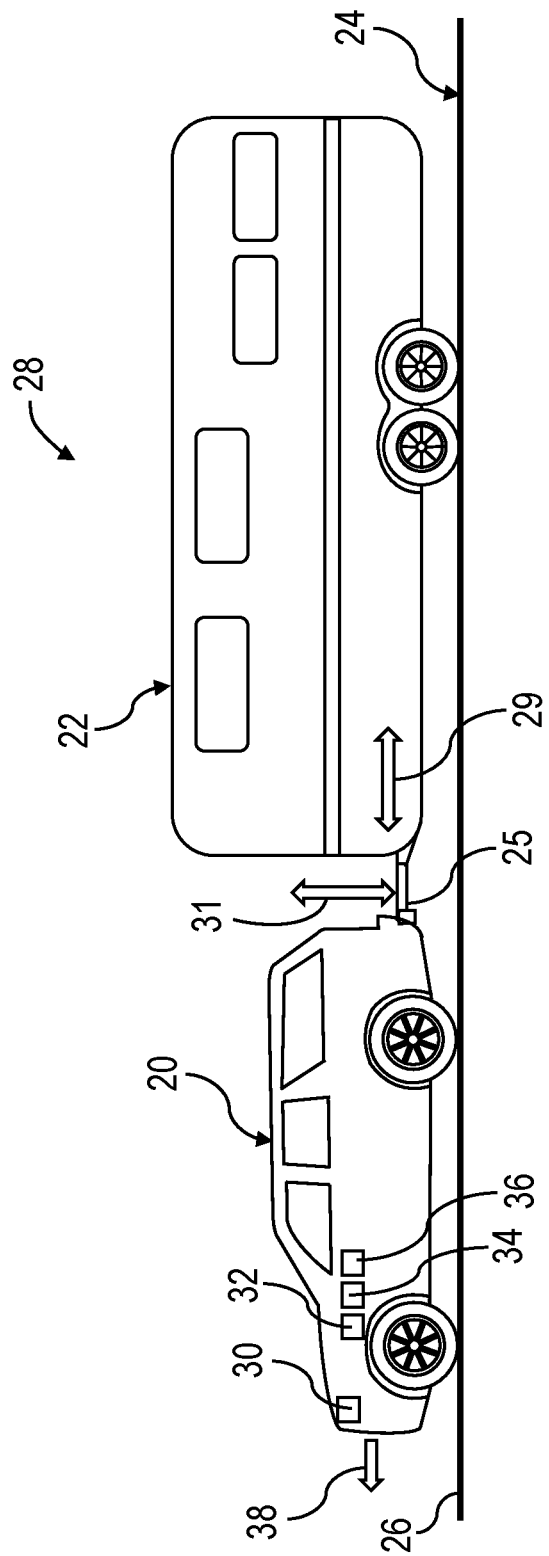
FIG. 1 is a schematic illustration of a vehicle-trailer system operating on a roadway, in accordance with various embodiments.

Referring to FIG. 1, a vehicle 20 towing a trailer 22 is illustrated travelling on a roadway 24 that has a road profile 26. The road profile 26 is defined by the surface of the roadway 24 and may include variations such as curves, hills, bank changes, etc., that have an effect on forces experienced by the vehicle 20 and the trailer 22 and between the vehicle 20 and the trailer 22. As used herein, the term "road profile" means a set of road features over which a vehicle will navigate and may include curves, grades (uphill and downhill), and other features that affect the dynamics of the vehicle 20 and/or the towed trailer 22. The trailer 22 may be releasably coupled with the vehicle 20 by a hitch 25 for travel over the roadway 24. As used herein, "vehicle" may refer to a host vehicle, such as the vehicle 20, that tows a trailer, such as the trailer 22. The term tow-vehicle may also be used to refer to the towing vehicle. In embodiments, a motorized automobile may serve as the vehicle 20 towing the trailer 22 in a vehicle-trailer system 28. The term vehicle may also be used to refer to a vehicle 20 and trailer 22 combination together. As used herein, "trailer" may refer to a towed apparatus, such as the trailer 22 configured to be coupled with, and moved by, a motorized vehicle, such as the vehicle 20.

The trailer 22 is illustrated for representation purposes and may be any mobile apparatus being towed by the vehicle 20, such as a boat, a camping trailer, a utility trailer, a specialized type of mobile equipment, etc. The vehicle-trailer system 28 operates on a route that may be preplanned and stored in a navigation system for travel to a selected destination, or may be spontaneously controlled by a human driver. At various points of the trip, the roadway 24 includes may include features such as hills and curves, which when encountered, may have an effect on the dynamics of the vehicle 20 and of the trailer 22, where the effect has various levels depending on the grade of the hill or the radius of the curve. Operation of the vehicle-trailer system 28 may preferably include changes in operation of the vehicle 20 to avoid instabilities such as sway, oscillation, excessive lateral acceleration, etc. For example, when travelling downhill, the trailer 22 may apply a longitudinal force 29 toward the vehicle 20. When travelling uphill, the longitudinal force 29 may be directed away from the vehicle 20. In addition, the hitch 25 may experience a vertical force 31 that varies and may be directed upward or downward.

The vehicle 20 includes a sensor system, such as a suitable sensor array 30, that may include cameras, radar, lidar, etc., that may be applicable to detect lane markings, objects, curves, hills, slope, road surface, etc., consistent with the discussion herein. The vehicle 20 may also include a map system, such as a map database 32, that may be a high-definition map database, an interface 34, and a GPS unit 36 that may be a high-precision GPS unit. The map database 32 stores map information at a high level of detail. The route of the vehicle 20 may be visually depicted on the interface 34. In embodiments, the vehicle 20 may be operated at a set speed, such as in a cruise control mode where a human driver steers and brakes the vehicle 20. In other embodiments, the vehicle 20 may be operated in a higher level in a semi-autonomous or autonomous mode, where the steering and/or braking are automatically controlled. As used herein, the term prediction horizon 38 means the distance over which the systems of the vehicle 20 are capable of predicting dynamics of the vehicle 20 and the trailer 22 during upcoming travel on the roadway 24 over the distance of the prediction horizon 38.

Figure 2:
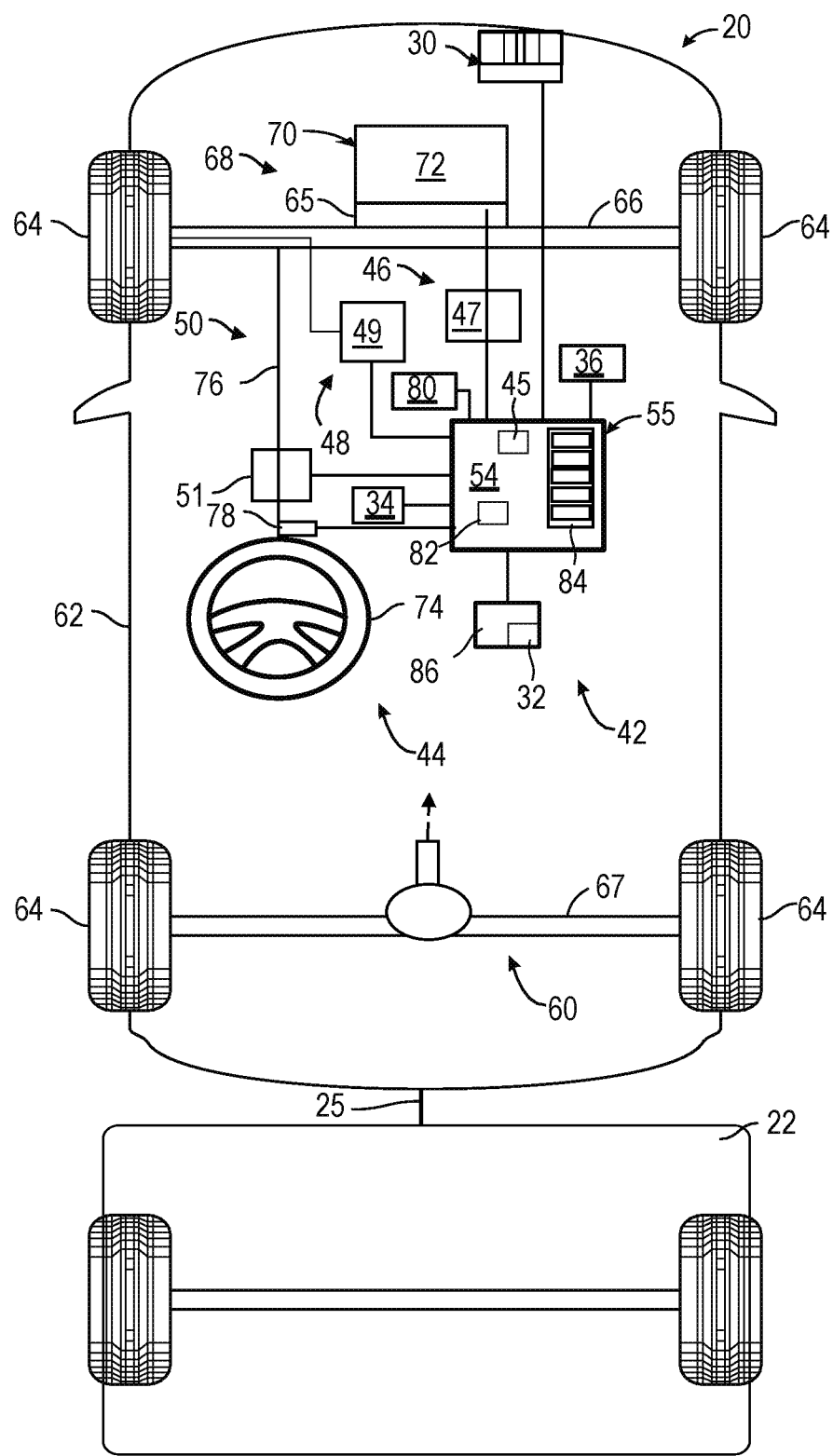
FIG. 2 is a functional block diagram of the vehicle of FIG. 1, in accordance with various embodiments.

With reference to FIG. 2, certain features of the vehicle 20 are illustrated in functional block diagram form. It will be appreciated that the vehicle is adapted to operate as a tow-vehicle for towing a trailer such as the trailer 22. The vehicle 20 includes a hitch 25 for coupling with the trailer 22. As depicted in FIG. 2 and described in greater detail further below, the vehicle 20 includes a driving control system 42 for controlling one or more automated systems 44 of the vehicle 20, such as an accelerator system 46, a braking system 48, and/or a steering system 50 of the vehicle 20, among other possible automated systems 44. The driving control system 42 operates both when the vehicle 20 is driven independently and when the vehicle 20 operates as a tow-vehicle with the trailer 22 coupled to the hitch 25. The driving control system 42 includes the sensor array 30, that may include cameras, radar, lidar, etc., that may be applicable to detect lane markings, objects, curves, hills, slope, etc., consistent with the discussion herein. The vehicle 20 may also include the map database 32 and the interface 34. The driving control system 42 includes a controller 54. In various examples, the controller 54 controls the automated systems 44 based on one or more operational modes of the vehicle 20, in accordance with the steps set forth further below in connection with the processes and methods described herein.

As depicted in FIG. 2, the vehicle 20 includes, in addition to the above-referenced driving control system 42, a chassis 60, a body 62, four wheels 64, the accelerator system 46, the steering system 50, and the braking system 48. The body 62 is arranged on, or integrated with, the chassis 60 and substantially encloses the other components of the vehicle 20. The wheels 64 are each rotationally coupled to the chassis 60 near a respective corner of the body 62. In various examples the vehicle 20 may differ from that depicted in FIG. 2. For example, in certain examples the number of wheels 64 may vary. By way of additional example, in various examples the vehicle 20 may not have a steering system, and for example may be steered by differential braking, among various other possible differences. The vehicle 20 includes the hitch 25 adapted to releasably couple with trailers, such as the trailer 22.

In the example illustrated in FIG. 2, the vehicle 20 includes an actuator assembly 68. The actuator assembly 68 includes at least one propulsion system 70 mounted on the chassis 60 that drives any number of the wheels 64. The propulsion system 70 is shown coupled with the front axle 66 through a transmission 65 and in a number of embodiments may be coupled with the rear axle 67 instead, or with both axles 66, 67. In embodiments, the actuator assembly 68 may comprise one of the automated systems 44. In the depicted example, the actuator assembly 68 includes an engine 72. In one example, the engine 72 comprises a combustion engine. In other examples, the actuator assembly 68 may include one or more other types of engines and/or motors, such as an electric motor/generator, instead of or in addition to the combustion engine 72. In certain examples, the driving control system 42 controls the propulsion system 70 along with one or more other systems of the vehicle 20.

The automated systems 44 provide automatic driving features of the vehicle 20, at least in certain modes, with or without involvement from the driver. In one example, the automated systems 44 provide for automated driver assistance through the automated systems 44 (with instructions provided by the driving control system 42, either directly or indirectly via the controller 54) when in an automated mode, and allow for driver involvement and control when in manual modes. In the depicted example, the automated systems 44 include the accelerator system 46, the braking system 48 and the steering system 50. It will be appreciated that in certain examples the steering system 50 may be automated and not the braking system 48, or vice versa. It will also be appreciated that in certain examples one or more other automated systems 44 may be utilized. For example, in certain examples, an automated system 44 may be utilized that automates braking and steering using inputs from the sensor array 30, the high-definition map database 32, and the high-precision GPS unit 36, such as in the General Motors' SUPERCRUISE® capability. In certain examples, the entire vehicle 20 (e.g. all vehicle systems) may be automated when in the automated mode, while in certain other examples only certain vehicle systems may be automated or engaged at any particular time.

In embodiments, the controller 54 may generate, via a map generator module 45, a map of the roadway 24 for the prediction horizon 38, such as for supplementing the map database 32, such as for use when an unmapped road is encountered. The map generator module 45 generates the map based on data from the sensor array 30, which may include image data and range point data provided from one or more ranging systems (e.g., lidar and/or radar systems). The image data includes pixel information obtained via cameras. The generated map is a machine-readable representation of the driving environment. The generated map includes features of the driving environment acquired via the sensor array 30 at any given time.

In the embodiment of FIG. 2, the accelerator system 46 is coupled with the propulsion system 70 and controls the speed of the vehicle 20, such as through an actuator 47. In various examples, when in a manual mode, the accelerator system 46 receives inputs from a driver of the vehicle 20 when a change in speed is desired. In certain examples, when in an automated mode, the accelerator system 46 utilizes speed commands from the driving control system 42 (either directly and/or indirectly from the controller 54), effected through the actuator 47 with no involvement from the driver. Also in certain examples, the accelerator system 46 includes an automatic speed adjustment functionality when in the automated mode, such as in an adaptive cruise mode.

The steering system 50 is mounted on the chassis 60, and controls steering of the wheels 64. In the depicted example, the steering system 50 includes a steering wheel 74, a steering column 76, and a turn signal actuator 78. In various examples, when in a manual mode, the steering wheel 74 and turn signal actuator 78 receive inputs from a driver of the vehicle 20 when a turn is desired, and the steering column 76 results in desired steering angles for the wheels 64 based on the inputs from the driver. In certain examples, when in an automated mode, the steering system 50 utilizes steering commands from the driving control system 42 (either directly and/or indirectly from the controller 54), with no involvement from the driver, effected through an actuator 51. Also in certain examples, the steering system 50 may include an automatic lane centering functionality when in the automated mode.

The braking system 48 is mounted on the chassis 60, and provides braking for the vehicle 20. When in a manual mode, the braking system 48 is actuated through an actuator 49, which may be a brake pedal when actuated by the driver or which may be an electric actuator when actuated by the controller 54, and provides appropriate braking via brake units (not depicted) at the wheels 64. In certain examples, when in an automated mode, the braking system 48 utilizes braking commands from the driving control system 42 (either directly and/or indirectly from the controller 54), with no involvement from the driver, effected through the actuator 49. Also in certain examples, the braking system 48 includes torque vectoring and/or differential braking functionality, which may include involvement of the propulsion system 70 being controlled by the controller 54.

As noted above and depicted in FIG. 2, in one example the driving control system 42 includes the sensor array 30, the high-definition map database 32, the interface 34, the controller 54, and may include a navigation system 80. The sensor array 30 includes various devices (also referred to herein as sensors) that sense observable conditions of the exterior environment and/or the interior environment of the vehicle 20. In one example, the sensor array 30 corresponds to the vehicle sensors of FIG. 1. Also in one example, the sensor array 30 includes various other sensors such as one or more inertial measurement sensors that measure inertial measurement values for the vehicle 20 (e.g. one or more gyro yaw sensors for measuring a gyro yaw rate for the vehicle 20), along with one or more wheel speed sensors (e.g. associated with one or more wheels 64 of the vehicle 20) and a drivetrain speed sensor (e.g. for detecting a speed the vehicle 20). The sensors of the sensor array 30 provide their respective measurements and values to the driving control system 42 for processing.

In the sensor array 30, cameras (or image sensors) may be spaced to provide three-hundred and sixty (360) degree image coverage of the environment surrounding the vehicle 20. The cameras capture images which may be processed and classified for further reference. Also in the sensor array 30, lidar devices perform scans to generate a lidar point cloud that represents the spatial structure/characteristics of objects within the field of view. In various embodiments, one or more instructions of the controller 54 are embodied in an automated driver assistance system (ADAS) that generates a vehicle planned trajectory and a speed profile, and at least one of the vehicle planned trajectory and the speed profile may be processed to generate the control signals to control one or more of the actuators of the automated systems 44 to execute one or more control actions to automatically control the vehicle 20 (e.g., to automate the driving task encountered in the particular driving scenario).

As illustrated in FIG. 2, the controller 54 is a part of or comprises a computer system 55. It will be appreciated that the controller 54 may otherwise differ from the example depicted in FIG. 2. The controller 54 may be configured as any number of controllers and/or microcontrollers in communication with each other. The controller 54 is coupled in the driving control system 42, such as with the sensor array 30 and the automated systems 44, and is coupled with other devices and systems of the vehicle 20. The controller 54 may accept information from various sources, process that information, and provide control commands based thereon to effect outcomes such as operation of the vehicle 20 and its systems, including of the automated systems 44. In the depicted embodiment, the controller 54 includes a processor 82 and a memory device 84, and is coupled with a storage device 86. The processor 82 performs the computation and control functions of the controller 54, and may comprise any type of processor or multiple processors, single integrated circuits such as a microprocessor, or any suitable number of integrated circuit devices and/or circuit boards working in cooperation to accomplish the functions of a processing unit. During operation, the processor 82 may execute one or more programs and may use data, each of which may be contained within the storage device 86 and as such, the processor 82 controls the general operation of the controller 54 in executing the processes described herein, such as the processes and methods described in greater detail below.

The memory device 84 may be any type of suitable memory. For example, the memory device 84 may include volatile and nonvolatile storage in read-only memory (ROM), random-access memory (RAM), and keep-alive memory (KAM), for example. KAM is a persistent or non-volatile memory that may be used to store various operating variables while the processor 82 is powered down. The memory device 84 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 54. In the depicted embodiment, the memory device 84 may store the above-referenced programs along with one or more stored values of the data such as for short-term data access.

The storage device 86 stores the data, such as for long-term data access for use in automatically controlling the vehicle 20 and its systems. The storage device 86 may be any suitable type of storage apparatus, including direct access storage devices such as hard disk drives, flash systems, floppy disk drives and optical disk drives. The storage device 86 comprises a non-transitory computer readable medium configured to store data, such as on the vehicle 20 and the trailer 22. In one exemplary embodiment, the storage device 86 comprises a source from which the memory device 84 receives the programs that execute one or more embodiments of one or more processes of the present disclosure. In another exemplary embodiment, the programs may be directly stored in and/or otherwise accessed by the memory device 84. The programs represent executable instructions, used by the controller 54 in processing information and in controlling the vehicle 20 and its systems, including the driving control system 42 and the automated systems 44.

While the components of the driving control system 42 are depicted as being part of the same system, it will be appreciated that in certain embodiments these features may comprise multiple systems. In addition, in various embodiments the driving control system 42 may comprise all or part of, and/or may be coupled to, various other vehicle devices and systems, such as, among others, the automated systems 44 and/or other systems of the vehicle 20.

The interface 34, for example a human-machine interface, enables communication of inputs to the computer system 55, for example from a vehicle driver, and may be implemented using any suitable method and apparatus. For example, the driver may input parameters of the trailer 22 using the interface 34. The interface 34 also enables communication of information and alerts to the driver from the controller 54 of the computer system 55.

Figure 3:
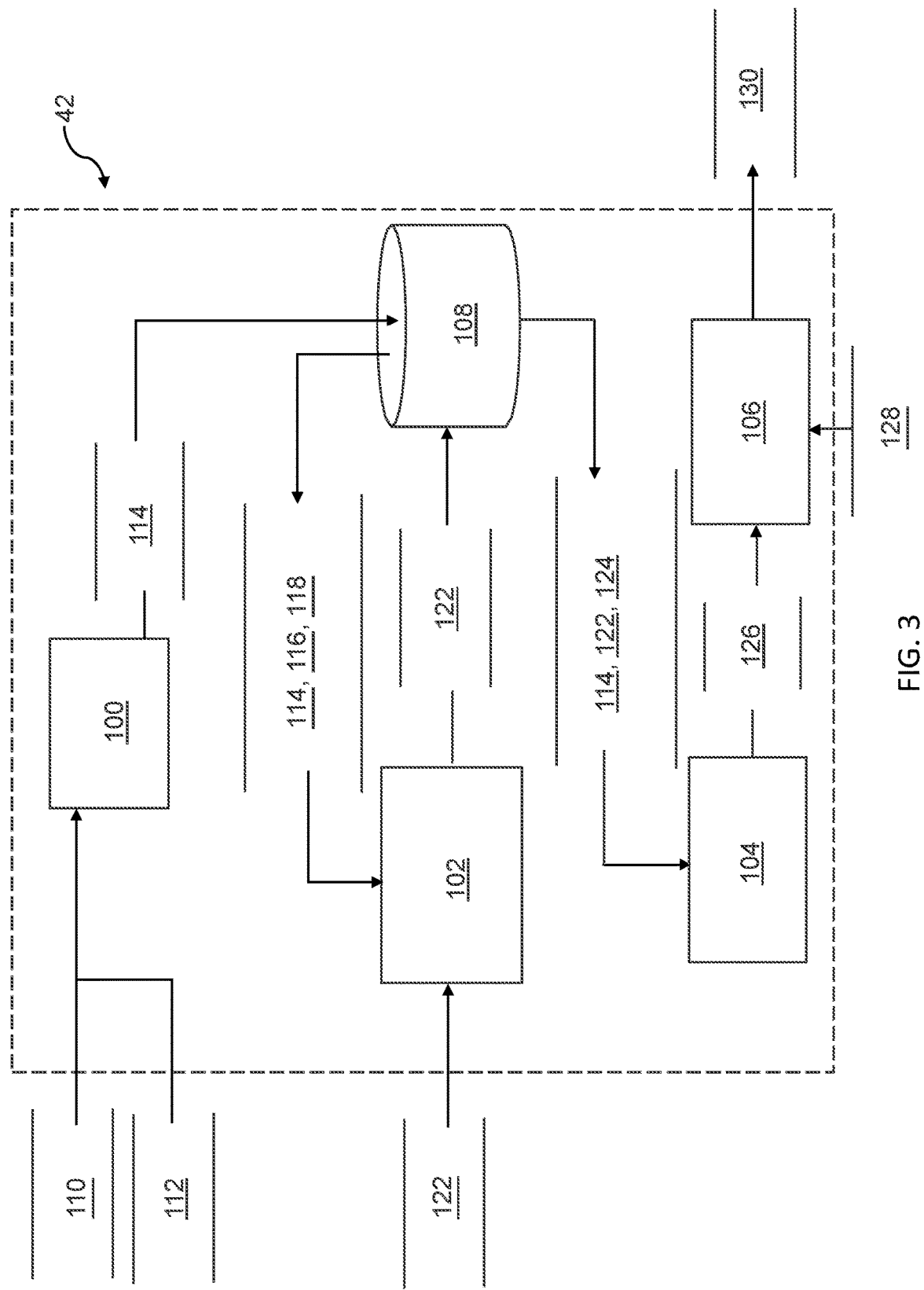
FIG. 3 is a dataflow diagram illustrating elements of a driving control system of the vehicle of FIG. 1, in accordance with various embodiments.

Referring to FIG. 3, elements of the driving control system 42 for adapted control of the vehicle-trailer system 28 are illustrated in dataflow diagram form in accordance with various embodiments. As will be appreciated, various embodiments of the driving control system 42 according to the present disclosure may include any number of modules embedded within the controller 54 or in multiple controllers, which may be combined and/or further partitioned to implement the systems and methods described herein. Inputs to the driving control system 42 may be received from various sensors of the vehicle 20 including the sensor array 30, from other control modules (not shown) associated with the vehicle 20, and/or determined by other sub-modules (not shown) within the controller 54. For simplicity, descriptions may refer to one controller 54, which means one or more controllers, including in the claims. The driving control system 42 may be configured to include a path projection module 100, a parameter collection and prediction module 102, an instability prediction module 104, a vehicle control module 106, and a datastore 108.

In various embodiments, the path projection module 100 receives as input path data 110 and sensor data 112. The path data 110 may include data from the GPS unit 36, the map database 32 and/or the navigation system 80. The sensor data 112 may include data from the sensor array 30, such as camera, lidar etc. data. The path projection module 100 projects a projected trajectory that is a predicted trajectory or a planned trajectory for the vehicle-trailer system 28 over the prediction horizon 38 resulting in projected trajectory data 114. The reach of the prediction horizon 38 may vary depending on whether the map database 32 contains high-definition data for the upcoming segment of the route or whether the segment may be effectively unmapped in which case the sensor data 112 will define the distance of the prediction horizon 38 base on system capabilities. When the trajectory is predicted, such as when the vehicle 20 is under driver steering control, the projected trajectory data represents the expected path of the vehicle remaining centered in its current travel lane of the roadway 24. When the trajectory is planned, such as when steering is controlled by the controller 54, the path is generally defined to maintain the vehicle-trailer system 28 in a centered condition in its lane along the roadway 24, subject to other environmental or dynamic conditions that exist that include a variance. The projected trajectory data 114 includes the vehicle trajectory and parameters of the roadway 24 obtained from the path data 110 and/or the sensor data 112 and is stored in the datastore 108.

In various embodiments, the parameter collection and prediction module 102 receives as input vehicle parameter data 116, trailer parameter data 118, and the projected trajectory data 114, such as from the datastore 108, and may also receive environmental data 120. The vehicle parameter data 116 includes various data defining a parameter of the vehicle 20 such as vehicle wheelbase, vehicle mass etc. that are constants and may be stored and retrieved from the datastore 108. The trailer parameter data 118 may be similarly retrieved from the datastore 108 and may include parameters such as trailer wheelbase, trailer weight, etc. that are constants. The constant vehicle parameter data 116 may be saved when the vehicle 20 is manufactured. The constant trailer parameter data 118 may be saved such as from input through the interface 34. The projected trajectory data 114 includes parameters such as radius of curvature of the upcoming roadway segment, slope of the roadway 24, etc. The environmental data 120 may include parameters on the roadway 24, such as surface type for defining friction values and which may be discerned by the sensor array 30. The parameter collection and prediction module 102 computes, using the projected trajectory data 114, non-constant parameters over the prediction horizon 38 using available and applicable mathematic relationships, the constant parameters and the roadway parameters. These include values such as vehicle lateral accelerations ($\alpha_y$), vehicle yaw rates (r), hitch angles and hitch forces. Such parameters comprise predicted parameters because the planned trajectory over the prediction horizon 38 lies ahead of the vehicle-trailer system 28. Trailer inertia may be estimated using a calibratable radius of gyration. The collected and predicted parameters are stored in the datastore 108 as consolidated parameter data 122.

In various embodiments, the instability prediction module 104 receives as input the projected trajectory data 114, the consolidated parameter data 122 and trailering dynamics model data 124, such as from the datastore 108. For a vehicle, such as the vehicle 20, a dynamics model is configured, calibrated and stored for the specific vehicle model for use in real-time computations when the vehicle 20 is operated independent of a trailer. That model for the vehicle 20 is adapted to a trailering mode model. For example, when a trailer is electrically coupled with the vehicle 20, such as for trailer light control, a trailering mode may be triggered. The trailering dynamics model data 124 may be selected based on the parameters of the trailer 22 as input through the interface 34, or may be selected from a menu with a list of trailer categories. The interface 34 may be used to request an input or selection from the driver of the vehicle 20. In general, the instability prediction module 104 computes predicted dynamics for the vehicle-trailer system 28 through the planned/projected trajectory.

Using the projected trajectory data 114, the consolidated parameter data 122, and the adapted dynamics model (trailering dynamics model data 124), the instability prediction module 104 predicts whether instabilities will arise over the prediction horizon 38, before the vehicle 20 travels over the distance of the prediction horizon 38. Dynamic characteristics of the vehicle-trailer system 28 are computed for the projected/planned trajectory. For example the instability prediction module 104 may compute whether the sway speed limit will be exceeded or approached within a selected margin using the relationship: $c_3c_2c_1-c_1-c_3c_3{}^2c_0=f(V_x)$, which is further described below. Also for example, the instability prediction module 104 may compute whether the jackknifing speed limit will be exceeded or approached within a selected margin using the relationship:

$$V_x^{lim} = \sqrt{\frac{-l}{K_{us}^{est}}},$$

which is further described below. Also for example, the instability prediction module 104 may compute whether a lateral acceleration will be exceeded, such as by using the relationship:

$$a_y = \frac{V_x^2}{R}.$$

Each of the computations may be made for various points along the prediction horizon 38. For example, the values may be computed continuously during a trailering mode at select intervals to obtain a thorough evaluation of the upcoming roadway (e.g. once per second or less). Using the computations, the instability prediction module 104 identifies whether instabilities will arise (or be approached within a selected margin), quantifies the extent of instability, and generates quantified instability data 126.

In various embodiments, the vehicle control module 106 receives as input the quantified instability data 126 and vehicle mode data 128. The vehicle mode data 128 may be received from various modules of the controller 54 and defines whether the vehicle 20 is operating with speed control, such as in a cruise control mode, with automated driving control, such as with steering and/or braking control, and/or with torque control, such as with torque vectoring and/or differential braking. The vehicle mode data 128 defines the list of control actions that are available to the vehicle control module 106. The vehicle control module 106 generates control data 130 that controls the automated systems 44, such that the operation of the vehicle-trailer system 28 over the prediction horizon 38 and the given scenario of the roadway 24 is controlled in a consistently stable state. For example, is no instability is predicted, the vehicle 20 continues to operate at the set speed and along the planned trajectory. When instability is predicted, the vehicle control module 106 evaluates the available controls (speed, steering, braking and/or torque), and determines the adaptations needed to maintain stability.

Figure 4:
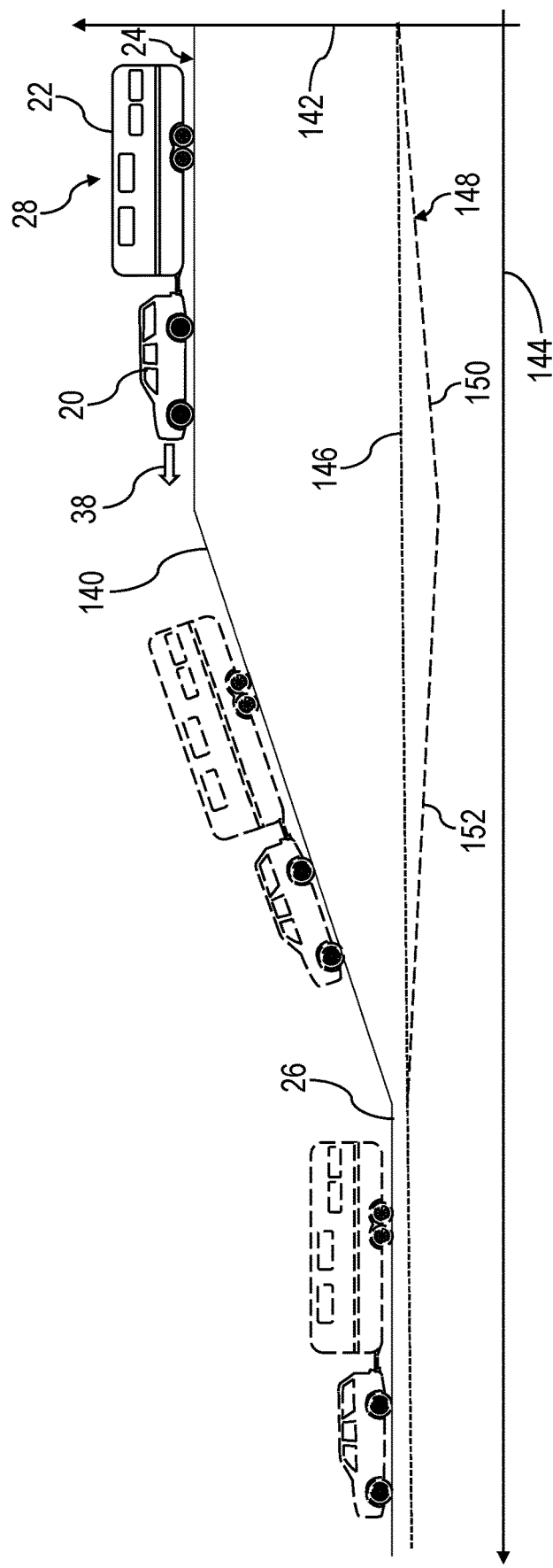
FIG. 4 is a schematic illustration of a vehicle-trailer system operating on a roadway with a hill, in accordance with various embodiments.

Referring to FIG. 4, a driving scenario involving a hill 140 along the road profile 26 of the roadway 24 is depicted. In this case the hill 140 involves a downslope that the vehicle 20 will navigate over while towing the trailer 22. FIG. 4 includes a graph of speed on the vertical axis 142 and distance on the horizontal axis 144. In the current example, the vehicle 20 is operating at a set speed 146, such as in a cruise control mode, and the length and/or grade angle of the hill 140 is predicted to lead to an instability at the set speed 146 if no preventive action is taken. In a longitudinal control adaptation via the driving control system 42, the actual speed 148 of the vehicle 20 is reduced in segment 150 when approaching the hill 140, and is increased in the segment 152 after entering the hill 140 back to the set speed 146 after exiting the hill 140.

Figure 5:
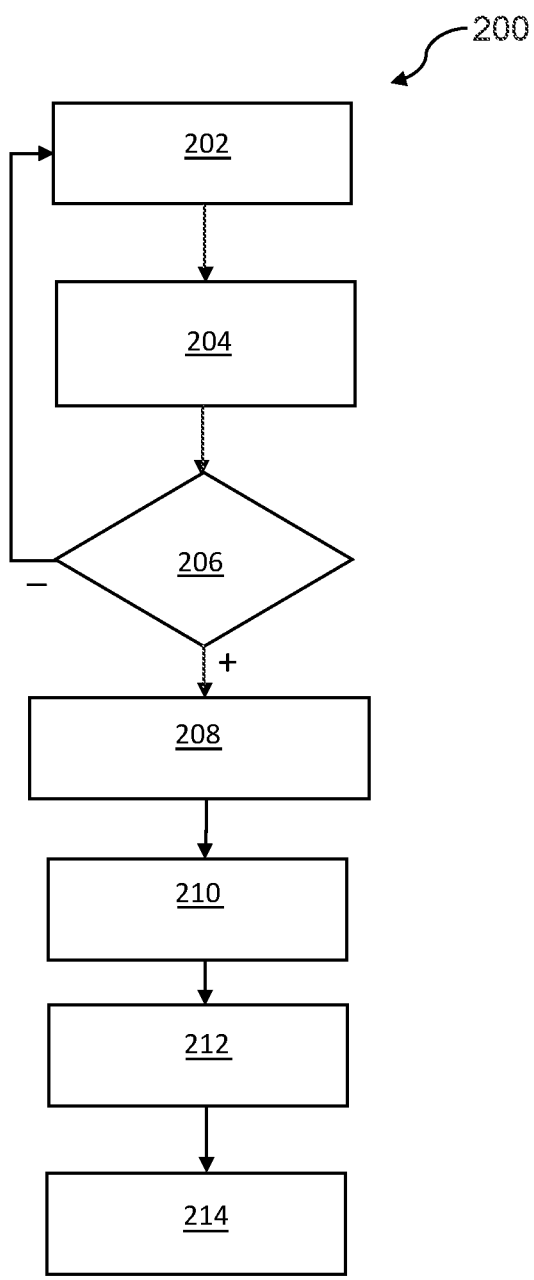
FIG. 5 is a flowchart of a process for operating the vehicle of FIG. 4 through the hill using longitudinal control, in accordance with various embodiments.

The driving scenario through the hill 140 is depicted in a method 200 of FIG. 5. As will be appreciated in light of the disclosure, the order of operation within the method 200 is not limited to the sequential execution as illustrated in FIG. 5, but may be performed in one or more varying orders as applicable and in accordance with the present disclosure. In various embodiments, the method 200 may be scheduled to run based on one or more predetermined events, and/or may run continuously during operation of the vehicle 20. In the method 200, the high-definition map database 32 is monitored 202 for features of the road profile 26 such as a hill or a curve. The controller 54 computes 204, such as by the processor 82 and prior to reaching the hill 140, dynamic characteristics of the vehicle-trailer system 28 for the projected trajectory (as predicted) down the hill 140 at the set speed 146 and considering environmental conditions. For example, the environmental data 120 may be used. The computations may be used to determine 206 whether a sway speed limit and/or a jackknifing speed limit will be approached or exceeded at the set speed 146 as further described below. When the determination 206 does not predict instability, the method 200 returns to monitoring 202. When the determination 206 results in a predicted instability such as sway being predicted to occur if the set speed 146 is maintained, a flag is raised and an alert is delivered 208 to the driver, such as through the interface 34, that speed will be adjusted. A speed profile is computed 210, such as by the controller 54, for traversing the hill 140 with the actual speed 148 remaining below critical speeds where sway is possible. The controller 54 delivers 212 longitudinal control, such as via the accelerator system 46 to effect the speed profile. Because a downslope is involved in the current example, the speed profile includes a deceleration followed by an acceleration back to the set speed 146. The acceleration may be initiated while the vehicle-trailer system 28 is still traversing the hill 140, or after travel over the hill 140 is complete. When the vehicle 20 is returned to the set speed 146, a message is delivered 214 to the driver, such as by the controller 54 via the interface 34.

In the example of FIGS. 4-5, the downslope scenario means that the trailer 22 will exert an increasing force toward the vehicle 20. Accordingly, the preventive control action involves a deceleration followed by an acceleration when the possibility of sway/instability has diminished. When the vehicle 20 is operating with automated control of the braking system 48, the control actions may include inhibiting excessive braking to maintain stability. In addition the rate of application of braking by the braking system 48 may be adapted to a less aggressive rate. The braking force and rate of application may be calibrated value reductions and retrieved from the storage device 86, or may be computed based on current operating conditions. In an upslope scenario, the trailer 22 will exert an increasing force pulling on the vehicle 20. As a result, the control actions may also include speed modifications and may include inhibiting excessive acceleration. When the vehicle 20 is operating with automated control of the braking system 48, the control actions may include adapting the rate of application of braking by the braking system 48 to a more aggressive rate. In addition, application of the brakes may be effected when the possibility of sway/instability has diminished.

Figure 6:
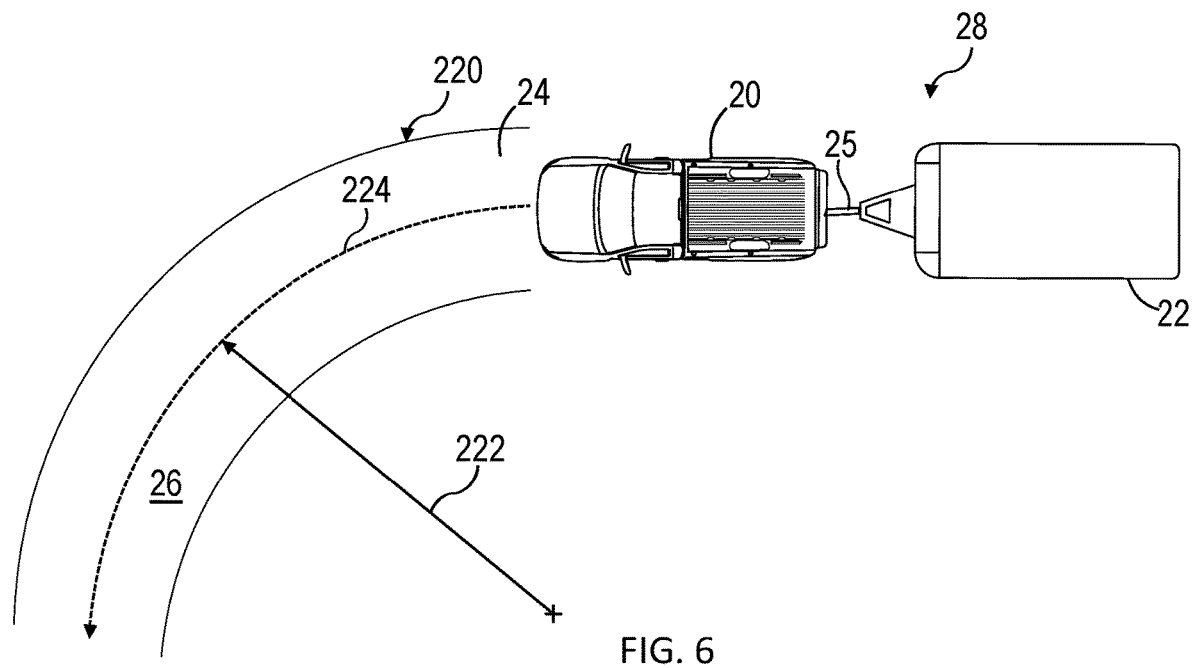
FIG. 6 is a schematic illustration of a vehicle-trailer system operating with automatic speed control on a roadway with a curve, in accordance with various embodiments.

Referring to FIG. 6, a driving scenario involving a curve 220 in the roadway 24 is depicted (showing the operating lane). In this case the curve 220 involves a radius of curvature 222 requiring steering to the left that the vehicle 20 will navigate over while towing the trailer 22. In the current example, the vehicle 20 is operating at the set speed 146, such as in a cruise control mode, and the radius of curvature 222 is predicted to result in an instability at the set speed 146 for the projected trajectory 224 if no preventive control action is taken. In this example, the driver of the vehicle 20 is in control of steering and braking. In a longitudinal control adaptation via the driving control system 42, the operating speed of the vehicle 20 is reduced approaching the curve 220 to avoid instability, such as by avoiding sway and/or limiting lateral acceleration to ensure dynamics remain below critical levels through the curve 220.

Figure 7:
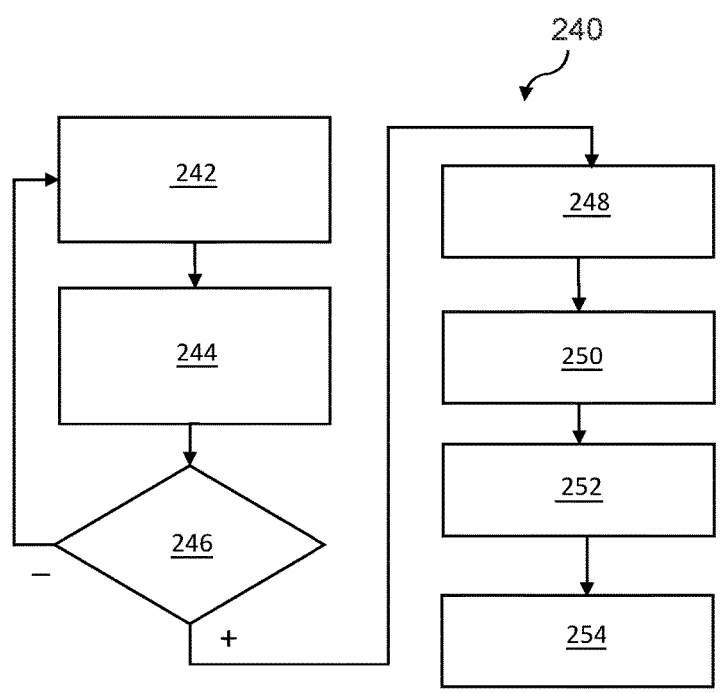
FIG. 7 is a flowchart of a process for operating the vehicle of FIG. 6 through the curve using longitudinal control, in accordance with various embodiments.

Referring to FIG. 7, a method 240 is illustrated for operation through the curve 220. As will be appreciated in light of the disclosure, the order of operation within the method 240 is not limited to the sequential execution as illustrated in FIG. 7, but may be performed in one or more varying orders as applicable and in accordance with the present disclosure. In various embodiments, the method 240 may be scheduled to run based on one or more predetermined events, and/or may run continuously during operation of the vehicle 20. The method 240, monitors 242 the sensor array 30 and/or the map database 32 for features of the road profile 26 such as a hill or a curve. When the curve 220 is detected, the controller 54 computes 244, such as by the processor 82 and prior to reaching the curve 220, dynamic characteristics of the vehicle-trailer system 28 for the projected trajectory 224 through the curve 220 at the set speed 146. For example, the computations may be used to determine 246 whether dynamic thresholds are exceeded. For example, the determination 246 may predict whether a sway speed limit and/or a jackknifing speed limit will be approached or exceeded at the set speed 146 as further described below. Also for example, the determination 246 may evaluate whether lateral acceleration is predicted to exceed a threshold. When the determination 246 does not predict an instability, the method 240 returns to monitoring 242. When the determination 246 predicts an instability such as sway being predicted to occur if the set speed 146 is maintained, a flag is raised and an alert is delivered 248 to the driver, such as through the interface 34, that a curve is ahead and/or that the speed will be adjusted. A speed profile is computed 250, such as by the controller 54, for traversing the curve with the actual speed of the vehicle-trailer system 28 remaining below critical speeds where instability is avoided and driver experience is optimized. For example the driver will experience optimized comfort and security. The controller 54 delivers 252 longitudinal control, such as via the accelerator system 46 to effect the speed profile. Because a curve is involved in the current example, the speed profile includes a deceleration followed by an acceleration back to the set speed. The deceleration is initiate prior to entering the curve 220 and the acceleration may be initiated while the vehicle-trailer system 28 is still traversing the curve 220 or after travel through the curve 220 is complete. When the vehicle 20 is returned to the set speed 146, a message is delivered 254 to the driver, such as by the controller 54 via the interface 34.

Figure 8:
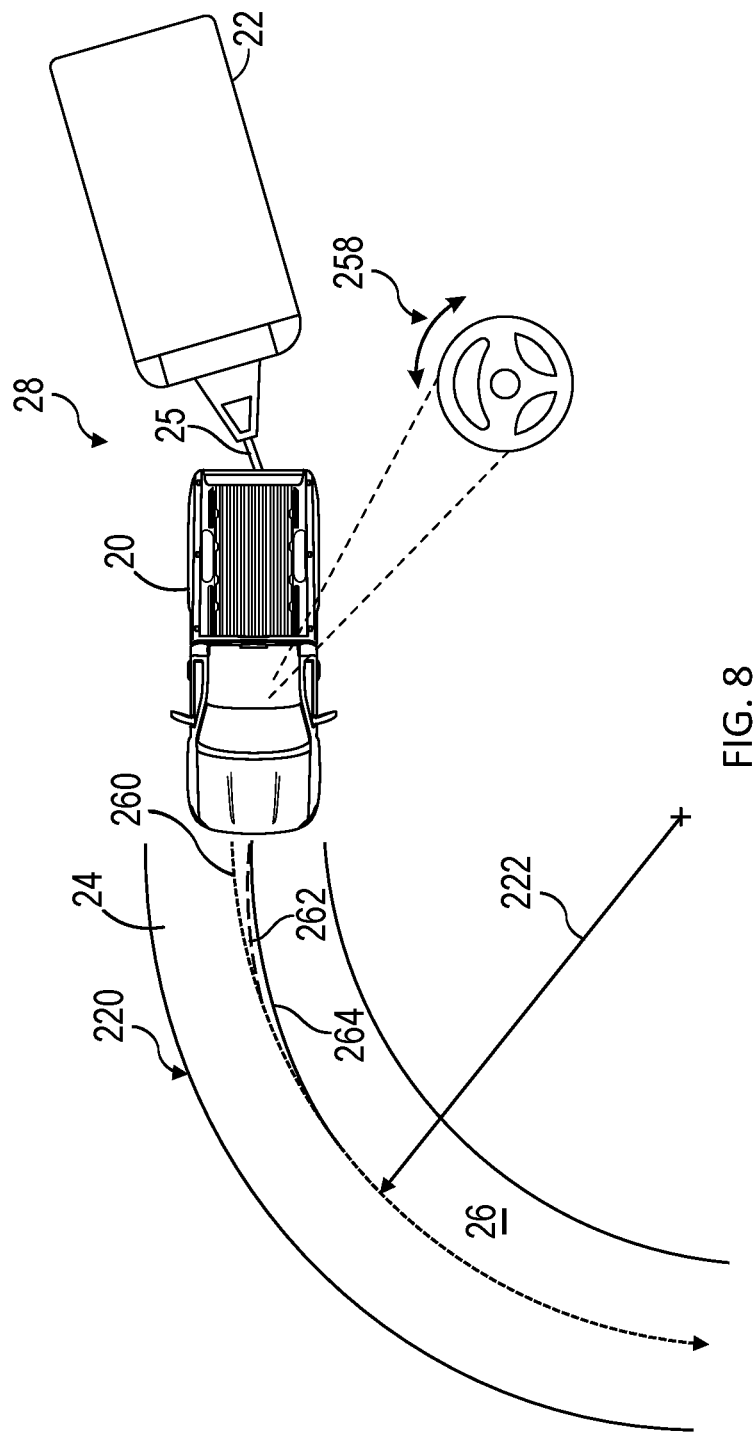
FIG. 8 is a schematic illustration of a vehicle-trailer system operating with automatic steering control on a roadway with a curve, in accordance with various embodiments.

As depicted in FIG. 8, another driving scenario involving the curve 220 in the roadway 24 is depicted. In the current example, the vehicle 20 is operating with automated speed and steering control and the radius of curvature 222 is predicted to result in an instability at the set speed 146 for the projected trajectory 260 through the curve 220 if no preventive control action is taken. In a longitudinal control adaptation via the driving control system 42, the operating speed of the vehicle 20 may be reduced approaching the curve 220, such as to limit lateral acceleration to ensure it remains below a critical level through the curve 220. However, in the current scenario it is possible to maintain lateral acceleration below the critical level by trajectory control through the steering system 50 while maintaining the set speed 146. Good tracking of the vehicle 20 through the curve 220 may be maintained along a trajectory segment 262 to converge with and join the projected trajectory 260, however, lateral acceleration for the vehicle-trailer system 28 may exceed a critical level on the trajectory segment 262 for the set speed 146. Accordingly, the steering system 50 is controlled, via the controller 54, to converge with the projected trajectory 260 along trajectory segment 264 more slowly to limit lateral acceleration below the critical level and avoid instabilities.

Figure 9:
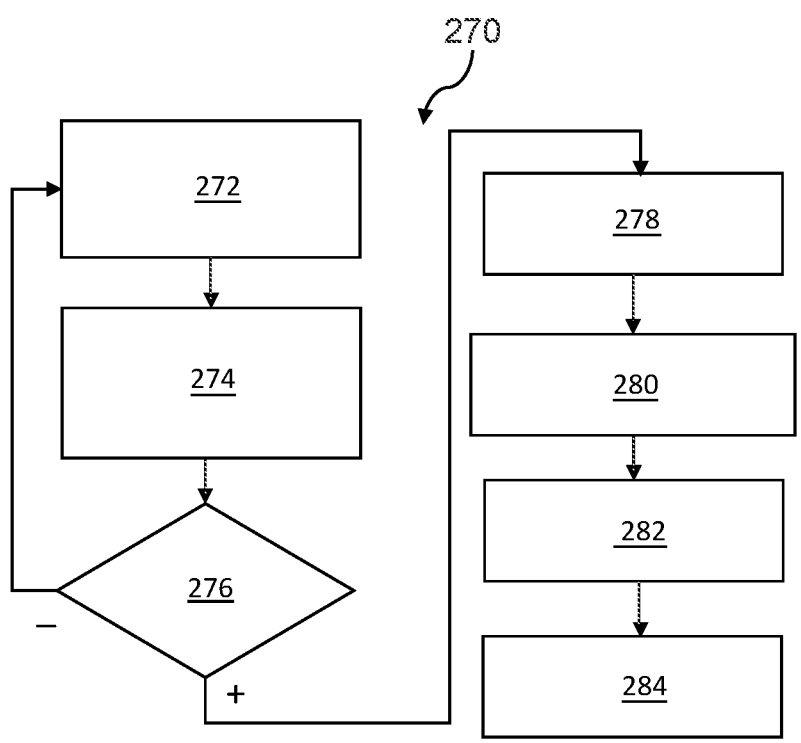
FIG. 9 is a flowchart of a process for operating the vehicle of FIG. 8 through the curve using trajectory control, in accordance with various embodiments.

Referring to FIG. 9, a method 270 is illustrated for operation through the curve 220 in ADAS control. As will be appreciated in light of the disclosure, the order of operation within the method 270 is not limited to the sequential execution as illustrated in FIG. 9, but may be performed in one or more varying orders as applicable and in accordance with the present disclosure. In various embodiments, the method 270 may be scheduled to run based on one or more predetermined events, and/or may run continuously during operation of the vehicle 20. The method 270, monitors 272 the sensor array 30 and/or the high-definition map database 32 for features of the road profile 26 such as a hill or a curve. When the curve 220 is detected, the controller 54 computes 274, such as by the processor 82 and prior to reaching the curve 220, dynamic characteristics of the vehicle-trailer system 28 for the projected trajectory 260 through the curve 220 at the set speed 146. For example, the computations may be used to determine 276 whether a sway speed limit and/or a jackknifing speed limit and/or a lateral acceleration threshold will be approached or exceeded at the set speed 146 as further described below. When the determination 276 predicts an instability such as sway being predicted to occur if the set speed 146 and is maintained and direct convergence to the projected trajectory 260 is chosen, such as along the direct convergence segment 262, a flag to limit lateral acceleration and damp vehicle motion is raised 278. A trajectory segment 264 is computed 280, such as by the controller 54, for traversing the curve 220 so convergence with the projected trajectory 260 preventing instability. The controller 54 delivers 282 trajectory control, such as via the steering system 50 to effect convergence with the projected trajectory 260 along the modified convergence trajectory segment 264 via commanded steering angles. Ongoing monitoring 284 and feedback may be provided, such as by monitoring the sensor array 30 and/or accelerometers to make real-time modifications to the modified convergence trajectory segment 264, if needed.

In determining whether instabilities may arise, the controller 54 computes and predicts dynamics such as the sway speed limit and the jackknifing speed limit based on vehicle-trailer system 28 parameters and states. The sway speed limit is computed using: $c_3c_2c_1-c_1-c_3c_3{}^2c_0=f(V_x)$, where $c_0$, $c_1$, $c_2$, $c_3$ are coefficients (detailed below), in the characteristic equation that is a function of longitudinal velocity of the vehicle-trailer system 28. The jackknifing speed limit is computed using:

$$V_x^{lim} = \sqrt{\frac{-l}{K_{us}^{est}}},$$

, where/is the wheelbase of the vehicle 20 and $k_{us}^{est}$ is the estimated vehicle understeer coefficient of the vehicle-trailer system 28. The wheelbase l is a physical parameter of the vehicle 20 and the estimated vehicle understeer coefficient of the vehicle-trailer system 28 may be computed using the following paragraph.

The understeer coefficient ($k_{us}$) is estimated in real-time using a steady state yaw rate response of vehicle as follows:

$$K_{us} = \frac{v_x \delta - \omega_z L}{v_x^2 \omega_z + v_x g \sin(\theta_{bank})}.$$

As used herein, the following list of parameters of the vehicle 20, of the trailer 22 and of the roadway 24 are identified with a corresponding description here:
  $m_v$: Vehicle mass;
  $m_t$: Trailer mass;
  $u/V_x$: Longitudinal velocity;
  $k_v$: Vehicle radius of gyration;
  $k_t$: Trailer radius of gyration;
  $l_1$: Distance from front axle to vehicle center of gravity;
  $l_2$: Distance from rear axle to vehicle center of gravity;
  $l_3$: Distance from trailer axle to trailer center of gravity;
  $l_{h1}$: Distance from hitch point to vehicle center of gravity;
  $l_{h2}$: Distance from hitch point to trailer center of gravity;
  L/l: Vehicle wheelbase;
  d: Distance from vehicle front axle to the hitch point;
  $d_2$: Trailer wheelbase;
  $c_1$: Vehicle front axle cornering stiffness;
  $c_2$: Vehicle rear axle cornering stiffness;
  $c_3$: Trailer axle cornering stiffness;
  $c_t$: Vehicle total cornering stiffness ($c_1+c_2$);
  C: Tire cornering stiffness;
  $k_{us}$: Vehicle understeer coefficient (without trailer);
  $k_{us}^{est}$: Estimated vehicle understeer coefficient (with trailer);
  β: Vehicle sideslip angle;
  δ: Road wheel steering angle;
  $a_y$: Vehicle lateral acceleration;
  r: Vehicle yaw rate;
  α: Tire lateral slip angle;
  $F_z$: Tire normal force; and
  R: Turning radius.

When parameters of the trailer, such as the trailer 22 are known, the sway speed limit is computed using the coefficients $c_0$, $c_1$, $c_2$, $c_3$ and the following relationships:

$$z = m_v m_t u \left( m_v k_v^2 (k_t^2 + l_{h2}^2) + m_t k_t^2 (k_v^2 + l_{h1}^2) \right) > 0;$$

$$C_{4=1};$$

$$C_3 = \frac{m_v m_t}{z} \left( C_3 (l_{h2}^2 + k_t^2)(l_{h1}^2 + k_v^2) + C_t (l_3^2 + k_t^2)(q_1^2 + k_v^2) \right) +$$

$$m_v^2 C_3 k_v^2 d_2^2 + m_t^2 C_t k_t^2 (q_1^2 + l_{h1}^2 + 2l_{h1} s_1);$$

$$C_2 = \frac{1}{uz} \left( u^2 \left( m_v C_3 d_2 \left( m_v k_v^2 + m_t \frac{l_{h2}}{d_2} (k_v^2 + l_{h1}^2) \right) \right) - m_t C_t (s_1 + $$

$$l_{h1}) \left( m_t k_t^2 + m_v \frac{s_1}{s_1 + l_{h1}} (k_t^2 + l_3^2) \right) \right) + m_v C_t C_3 d_2^2 (k_v^2 + q_1^2) + m_t C_t \left( C_3 (q_1^2 + l_{h1}^2 + $$

$$2 l_{h1} s_1)(k_t^2 + l_3^2) + C_t (q_1^2 - s_1^2)(k_t^2 + l_3^2) \right);$$

$$C_1 = \frac{C_t C_3 d_2}{u^2 C_t} \left( u^2 \left( m_v (q_1^2 + k_v^2 - s_1 d_2) + \frac{m_t l_3}{d_2} (q_1^2 + l_{h1}^2 + 2 s_1 l_{h1}) \right) - $$

$$\frac{m_t}{d_2} (s_1 + l_{h1})(l_3^2 + k_t^2) \right) + C_t d_2 (q_1^2 - s_1^2);$$

$$C_0 = \frac{C_t C_3 d_2}{uz} \left( -u^2 \left( m_v s_1 + \frac{m_t l_3}{d_2} (s_1 + l_{h1}) \right) + C_t (q_1^2 - s_1^2) \right);$$

$$q_1 = \sqrt{\frac{C_1 l_1^2 + C_2 l_2^2}{C_t}};$$

and $$s_1 = \frac{C_1 l_1 - C_2 l_2}{C_t}.$$

When parameters of the trailer, such as the trailer 22 are not known, a mass estimator and a hitch load estimator are used. In addition, trailer inertia is estimated using a calibratable radius of gyration, and the trailer wheelbase is estimated or the driver enters the value. In addition, the sway speed limit is computed using the following relationships:

$$z = m_v m_t u \left( m_v k_v^2 (k_t^2 + l_{h2}^2) + m_t k_t^2 (k_v^2 + l_{h1}^2) \right) > 0;$$

$$C_{4=1};$$

-continued $$C_3 = \frac{m_v m_t}{z}(C_3(l_{h2}^2 + k_t^2)(l_{h1}^2 + k_v^2) + C_t(l_3^2 + k_t^2)(q_1^2 + k_v^2)) +$$
$$m_v^2 C_3 k_v^2 d_2^2 + m_t^2 C_t k_t^2(q_1^2 + l_{h1}^2 + 2l_{h1} s_1);$$

$$C_2 = \frac{1}{uz}\left(u^2\left(m_v C_3 d_2\left(m_v k_v^2 + m_t \frac{l_{h2}}{d_2}(k_v^2 + l_{h1}^2)\right) - m_t C_t(s_1 + l_{h1})\left(m_t k_t^2 + m_v \frac{s_1}{s_1 + l_{h1}}(k_t^2 + l_3^2)\right)\right) + m_v C_t C_3 d_2^2(k_v^2 + q_1^2) + m_t C_t(C_3(q_1^2 + l_{h1}^2 + 2l_{h1} s_1)(k_t^2 + l_3^2) + C_t(q_1^2 - s_1^2)(k_t^2 + l_3^2))\right);$$

$$C_1 = \frac{C_t C_3 d_2}{u^2 C_t}\left(u^2\left(m_v(q_1^2 + k_v^2 - s_1 d_2) + \frac{m_t l_3}{d_2}(q_1^2 + l_{h1}^2 + 2s_1 l_{h1}) - \frac{m_t}{d_2}(s_1 + l_{h1})(l_3^2 + k_t^2)\right) + C_t d_2(q_1^2 - s_1^2)\right);$$

and $$C_0 = \frac{C_t C_3 d_2}{uz}\left(-u^2\left(m_v s_1 + \frac{m_t l_3}{d_2}(s_1 + l_{h1})\right) + C_t(q_1^2 - s_1^2)\right).$$

For use in force control, the torque distribution ratio is computed as a function of desired understeer coefficient, such as using a Fiala tire model as follows:

$$F^y = \begin{cases} C_\alpha t - \frac{C_\alpha^2}{3\eta\mu F^z}|t|t + \frac{C_\alpha^3}{27\eta^2\mu^2 F^{z^2}}t^3, & |\alpha| < \alpha^{sat} \\ \eta\mu F^z \text{sign}(\alpha), & \text{otherwise} \end{cases}$$

where:

$$\eta = \frac{\sqrt{(\mu F^z)^2 - (F^x)^2}}{\mu F^z};$$

$$t = \tan(\alpha);$$

and distribution ratio = $f(k_{us}, k_{us}^d)$;

Using the tire model to determine the distribution of braking force between the wheels 64, accounts for the situations where there are lateral forces on the wheels 64 which limit the longitudinal force ($F^y$) capacity of the wheels 64. Knowing the force capacity of the wheels 64 enables distributing braking force to approach the desired coefficient of understeer $k_{us}^d$ without exceeding the capacity of any one tire.

Figure 10:
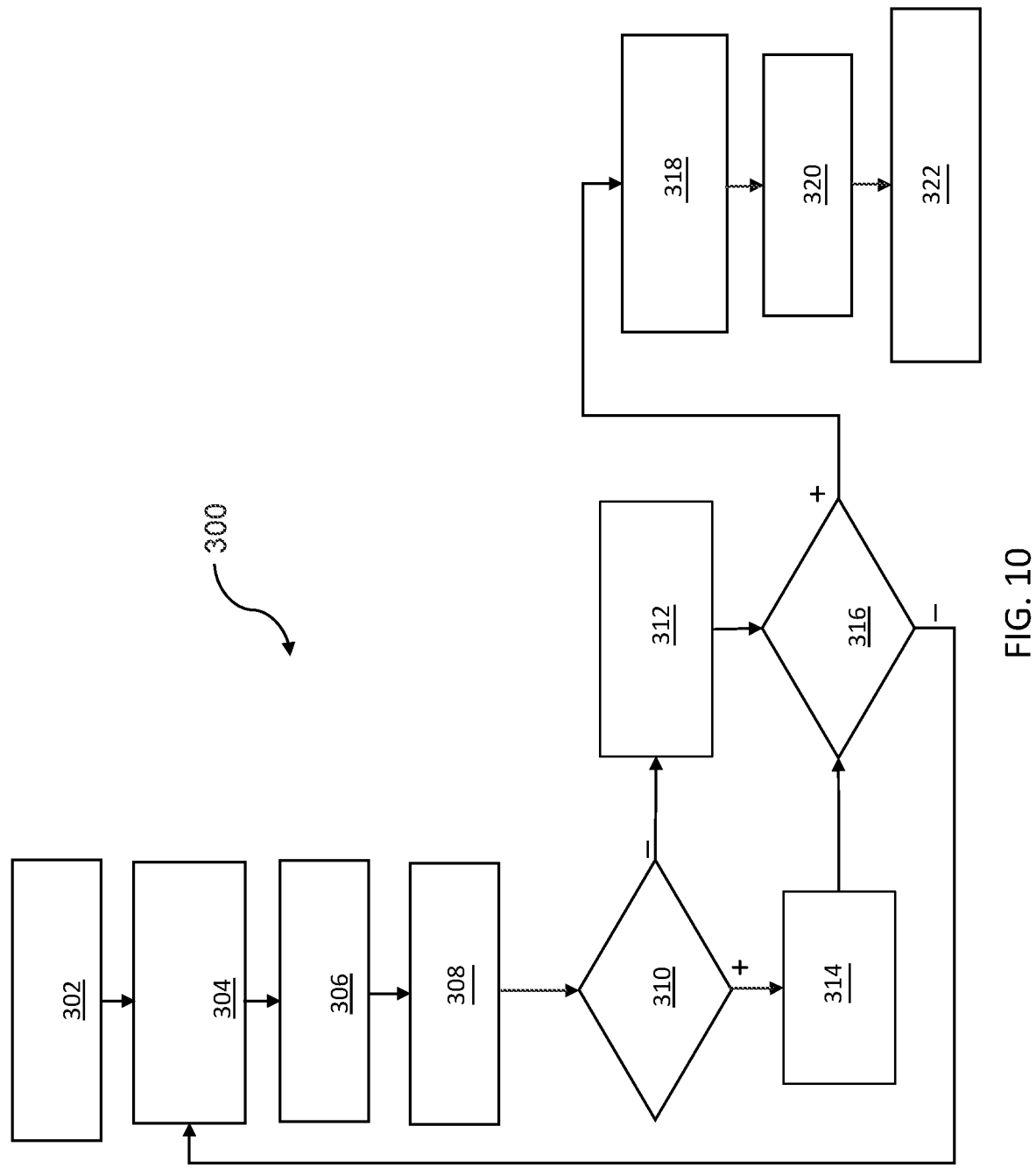
FIG. 10 is a flowchart of a process for operating the vehicle of FIG. 2 using at least one of longitudinal control, lateral control and torque control, in accordance with various embodiments.

Outputs from the driving control system 42 may include a speed profile, an adapted path profile, a braking profile and/or a force distribution profile for operation of the vehicle 20. With reference now to FIG. 10 and with continued reference to FIGS. 1-9, a flowchart illustrates a method 300 for providing tow-vehicle driving control of the vehicle 20 while operating with the trailer 22 coupled therewith as performed by the driving control system 42, in accordance with exemplary embodiments. As will be appreciated in light of the disclosure, the order of operation within the method 300 is not limited to the sequential execution as illustrated in FIG. 10, but may be performed in one or more varying orders as applicable and in accordance with the present disclosure. In various embodiments, the method 300 may be scheduled to run based on one or more predetermined events, and/or may run continuously during operation of the vehicle 20.

In one example, the method 300 may begin at 302, such as when the vehicle 20 is operating with a trailer, such as the trailer 22 attached. The method 300 monitors 304 the map database 32 and the sensor array 30. The method 300 determines 306 the projected trajectory of the vehicle-trailer system 28 over the prediction horizon 38. The method 300 estimates 308 the coefficient of understeer $k_{us}^{est}$ for the vehicle-trailer system over the prediction horizon 38. The method determines 310 whether the estimated coefficient of understeer $k_{us}^{est}$ indicates that the vehicle-trailer system 28 will experience an understeer condition over the prediction horizon 38 (e.g. is $k_{us}^{est} > 0$?). The determination may evaluate whether the understeer condition is within a margin of a design threshold with the margin separating the target from the design threshold. This may be used to predict the lateral dynamics behavior of the vehicle 20 with trailer 22 through the road profile 26. When the determination 310 is negative, meaning the vehicle-trailer system 28 will not experience an understeer condition, the method 300 proceeds to compute 312 the jackknifing speed limit using:

$$V_x^{lim} = \sqrt{\frac{-l}{K_{us}^{est}}},$$

When the determination 310 is positive, meaning the vehicle-trailer system 28 will experience an understeer condition, the method 300 proceeds to compute 314 the sway speed limit using: $c_3 c_2 c_1 - c_1 - c_3 c_3^2 c_0 = f(V_x)$. The method 300 proceeds to determine 316 whether either the jackknifing speed limit and/or the sway speed limit are predicted to be exceeded over the prediction horizon 38. When neither of the jackknifing speed limit and the sway speed limit will be exceeded, the determination 316 is negative and the method 300 returns to start 302 and proceeds therefrom, meaning no adaptation to the current vehicle control is needed over the prediction horizon 38.

When the determination 316 is positive, meaning at least one of the jackknifing speed limit and the sway speed limit will be exceeded, an instability is predicted to occur over the prediction horizon 38. In embodiments, the method 300 may also compute lateral accelerations and determine 316 whether a lateral acceleration threshold is exceeded. The method 300 identifies 318 the mode of automated control of the vehicle 20 (e.g. speed; speed, steering & braking; speed, steering, braking & force). The method 300 computes 320 vehicle dynamics for operation of the vehicle-trailer system 28 along a trajectory over the prediction horizon 38 distance to avoid the predicted instability. When in the speed control mode (cruise control), speed control is available and so the controller 54 computes 320 the speeds of operation through the distance of the prediction horizon 38 to maintain the speed below the applicable jackknifing speed limit and/or sway speed limit and the vehicle 20 is controlled with speed operation control 322 through the accelerator system 46. When in the speed, steering & braking control mode (ADAS), and lateral accelerations through a curve are indicated as the source of the predicted instability, the controller 54 computes 320 maximum turning curvature and maximum lateral acceleration for ADAS control. The controller 54 projects modifications to the projected trajectory (which in this case is a planned trajectory), of the vehicle 20 and if those modifications avoid instabilities, the projected trajectory is modified, such as to converge with the projected trajectory in a curve more slowly through operation control 322 of the steering system 50, while maintain the set speed of the vehicle 20. When a hill is the source of the predicted instability, the set speed is modified such as through operation control 322 of the accelerator system 46. If path convergence or speed modification is required over a shorter time frame, the controller 54 enacts operation control 322 the braking system 48. When in the speed, steering, braking & force control mode (electrified vehicle or other vehicle with torque ratioing/differential braking), the controller 54 may determine brake/wheel torque applications to create forces that offset sway oscillations/lateral accelerations and operate the braking system 48 and/or the propulsion system 70 to effect the forces. The controller 54 computes 320 brake/traction distribution ratio, such as using the Fiala tire model and distribution ratio=$f(k_{us}, k_{us}^d)$. The controller 54 delivers operation control 322 of the automated systems 44 to effect the calculated vehicle-trailer system 28 dynamics through the prediction horizon 38.

As the vehicle-trailer system 28 continues forward, renewed computation 320 may be made through the prediction horizon 38 considering both previously considered sections of the roadway 24 and additional segments further along the route. As such, the method restarts 202 continuously while the vehicle 20 is moving.

Accordingly, systems and methods predict trailer instabilities in advance and adapt automated driving strategies to control a vehicle and trailer without experiencing the predicted instabilities optimizing the driving experience. A selected margin from instabilities may be maintained by adapting lateral and/or longitudinal control through automated driving actions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof.

What is claimed is:

1. A method for a vehicle towing a trailer, comprising:
   operating, by a controller via an actuator system, the vehicle by controlling at least one of speed and steering angle of the vehicle;
   monitoring, by at least one of a map system and a sensor system, a roadway on which the vehicle is travelling for a road profile of the roadway located ahead of the vehicle over a prediction horizon;
   determining a projected trajectory for navigating the vehicle through the road profile over the prediction horizon and considering environmental conditions;
   computing, by a processor and before travel over the road profile, whether the projected trajectory through the road profile will result in exceeding a vehicle dynamic threshold, including determining whether an estimated coefficient of understeer is reaching approximately a design threshold of the vehicle and the trailer together, and when the estimated coefficient of understeer is at approximately the design threshold, computing a sway speed limit of the vehicle, and when the estimated coefficient of understeer is not at approximately the design threshold, computing a jackknifing speed limit;
   determining, when the projected trajectory will result in exceeding the vehicle dynamic threshold through the road profile as indicated by at least one of the computed sway speed limit and the jackknifing speed limit being exceeded, a control action to prevent instability and optimize driver experience; and
   operating, by the actuator system, the vehicle through the road profile using the control action.

2. The method of claim 1, comprising storing, on a non-transitory computer readable medium onboard the vehicle, vehicle data and trailer data including parameters associated with the vehicle and parameters associated with the trailer, wherein the computing comprises determining, using the vehicle data and the trailer data, whether the sway speed limit of the vehicle through the road profile will be exceeded.

3. The method of claim 1, wherein the computing comprises determining whether a set speed of the vehicle through the road profile will reach approximately or exceed each of the jackknifing speed limit, the sway speed limit and a lateral acceleration threshold, wherein:
   the jackknifing speed limit is determined as a function of a wheelbase of the vehicle and of an estimated vehicle understeer coefficient of the vehicle and the trailer as a system,
   the sway speed limit is determined, when parameters of the trailer are known, as a function of the parameters, and, when the parameters of the trailer are not known, using a mass estimator and a hitch load estimator, and
   the lateral acceleration threshold is determined as a function of velocity and turning radius.

4. The method of claim 1, wherein the computing comprises determining whether a lateral acceleration of the vehicle through the road profile will exceed a lateral acceleration threshold.

5. The method of claim 1, comprising identifying via the monitoring, a downhill slope in the road profile, wherein the control action includes:
   slowing, by the controller via the actuator system, the vehicle prior to entering the downhill slope; and
   accelerating, by the controller via the actuator system, the vehicle while traversing the downhill slope.

6. The method of claim 1, comprising estimating the estimated coefficient of understeer, to predict lateral dynamics behavior of the vehicle with the trailer through the road profile.

7. The method of claim 6, comprising determining whether the estimated coefficient of understeer is greater than the design threshold.

8. The method of claim 7, comprising computing, only when the estimated coefficient of understeer is at approximately the design threshold and whether parameters of the trailer are known or unknown, the sway speed limit of the vehicle.

9. The method of claim 7, comprising computing, only when the estimated coefficient of understeer is not at approximately the design threshold, the jackknifing speed limit of the vehicle.

10. The method of claim 1, comprising identifying via the monitoring, a curve in the road profile, wherein the control action includes:
    slowing, by the controller via the actuator system, a rate at which the vehicle converges with the projected trajectory in the curve to avoid instability.

11. A driving control system for a vehicle towing a trailer, comprising a controller including one or more modules stored on a memory and executable by one or more processors, the one or more modules configured to:

operate, via an actuator system, the vehicle by controlling at least one of speed and steering angle of the vehicle;

monitor, using at least one of a map system and a sensor system, a roadway on which the vehicle is travelling for a road profile of the roadway located ahead of the vehicle over a prediction horizon and considering environmental conditions;

determine, by the one or more modules, a projected trajectory for navigating the vehicle through the road profile over the prediction horizon;

compute, by a processor of the controller and before travel over the road profile, whether the projected trajectory through the road profile will result in exceeding a vehicle dynamic threshold, including determine whether an estimated coefficient of understeer is reaching approximately a design threshold of the vehicle and the trailer together, and when the estimated coefficient of understeer is reaching approximately the design threshold, compute a sway speed limit of the vehicle, and when the estimated coefficient of understeer is not reaching approximately the design threshold, compute a jackknifing speed limit;

determine, by the one or more modules and when the projected trajectory will result in exceeding the vehicle dynamic threshold through the road profile as indicated by at least one of the sway speed limit and the jackknifing speed limit will be exceeded, a control action to prevent instability and optimize driver experience; and operate, through control of the actuator system, the vehicle through the road profile using the control action.

12. The driving control system of claim 11, comprising a non-transitory computer readable medium onboard the vehicle configured to store vehicle data and trailer data including parameters associated with the vehicle and parameters associated with the trailer, wherein the controller is configured to determine, using the vehicle data and the trailer data, whether the sway speed limit of the vehicle through the road profile will be exceeded.

13. The driving control system of claim 11, wherein the controller is configured to determine whether the jackknifing speed limit of the vehicle through the road profile will be exceeded as a function of a wheelbase of the vehicle and of an estimated vehicle understeer coefficient of the vehicle and the trailer as a system.

14. The driving control system of claim 11, wherein the controller is configured to determine whether a lateral acceleration of the vehicle through the road profile will exceed a lateral acceleration threshold.

15. The driving control system of claim 11, wherein the controller is configured to:
identify a downhill slope in the road profile;
slow, via the actuator system, the vehicle prior to entering the downhill slope; and
accelerate, via the actuator system, the vehicle while traversing the downhill slope.

16. The driving control system of claim 11, wherein the controller is configured to estimate the estimated coefficient of understeer, to predict lateral dynamics behavior of the vehicle with the trailer through the road profile.

17. The driving control system of claim 16, wherein the controller is configured to determine whether the estimated coefficient of understeer is greater than the design threshold.

18. The driving control system of claim 17, wherein the controller is configured to:
compute, only when the estimated coefficient of understeer is at approximately the design threshold, the sway speed limit of the vehicle; and
compute, only when the estimated coefficient of understeer is not at approximately the design threshold, the jackknifing speed limit of the vehicle.

19. The driving control system of claim 11, wherein the controller is configured to:
identify, via the monitoring, a curve in the road profile; and
slow, by the controller via the actuator system, a rate at which the vehicle converges with the projected trajectory in the curve to avoid instability.

20. A vehicle configured to tow a trailer, the vehicle comprising:
a non-transitory computer readable medium onboard the vehicle configured to store vehicle data and trailer data including parameters associated with a vehicle and parameters associated with the trailer; and
a controller configured to:
operate, via an actuator system, the vehicle by controlling at least one of speed and steering angle of the vehicle;
monitor, using at least one of a map system and a sensor system, a roadway on which the vehicle is travelling for a road profile of the roadway located ahead of the vehicle over a prediction horizon;
determine a projected trajectory for navigating the vehicle through the road profile over the prediction horizon and considering environmental conditions;
compute, by a processor of the controller and before travel over the road profile and using the vehicle data and the trailer data, whether a vehicle dynamic threshold will be exceeded, wherein the vehicle dynamic threshold comprises a sway speed limit of the vehicle through the road profile and a jackknifing speed limit of the vehicle through the road profile, and includes determine whether an estimated coefficient of understeer is reaching approximately a design threshold of the vehicle and the trailer together, and when the estimated coefficient of understeer is reaching approximately the design threshold, compute the sway speed limit of the vehicle, and when the estimated coefficient of understeer is not reaching approximately the design threshold, compute the jackknifing speed limit and not compute the sway speed limit;
determine, when the projected trajectory will result in exceeding the vehicle dynamic threshold through the road profile, a control action to prevent instability and optimize driver experience; and
operate, through control of the actuator system, the vehicle through the road profile using the control action,
wherein the control action is selected from speed control, trajectory control and force control.

* * * * *